(12) United States Patent
Damola et al.

(10) Patent No.: US 9,552,373 B2
(45) Date of Patent: Jan. 24, 2017

(54) METHOD FOR PERFORMING FACE RECOGNITION IN A RADIO ACCESS NETWORK

(75) Inventors: Ayodele Damola, Solna (SE); Howard Green, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 221 days.

(21) Appl. No.: 14/362,395

(22) PCT Filed: Dec. 1, 2011

(86) PCT No.: PCT/SE2011/051464
§ 371 (c)(1),
(2), (4) Date: Dec. 5, 2014

(87) PCT Pub. No.: WO2013/081517
PCT Pub. Date: Jun. 6, 2013

(65) Prior Publication Data
US 2015/0078681 A1    Mar. 19, 2015

(51) Int. Cl.
*G06K 9/54* (2006.01)
*G06F 17/30* (2006.01)
(Continued)

(52) U.S. Cl.
CPC ... *G06F 17/30247* (2013.01); *G06F 17/30268* (2013.01); *G06K 9/00221* (2013.01);
(Continued)

(58) Field of Classification Search
CPC ............ G06K 9/00221; G06K 9/00228; G06K 9/00281; G06K 9/00288; G06K 9/00677; G06K 9/00885; G06K 9/00892; G06K 9/00979; G06K 9/4619; G06K 9/6234; G06K 9/6257; G06K 9/6293; G06K 9/6297; H04N 5/23206; H04N 7/147; H04N 7/155; H04N 7/181; H04N 7/183; H04N 7/188; G06T 7/0048; G06T 17/00; G06T 19/006; G06T 2207/20026; G06T 2207/30201; G06F 17/30247; G06F 17/30259; G06F 17/30268; G06F 21/32; G06F 21/62; G01L 17/00; G08B 13/19656; G06Q 10/10; G06Q 30/00; G06Q 30/0267; H04L 63/0407; H04L 63/08; H04L 63/0861; H04L 63/10; H04L 67/10; H04L 67/20; H04L 67/22; H04L 67/306; H04L 67/329; H04W 4/02; H04W 8/18; H04W 76/04; H04W 88/14; H04W 88/18; H04W 92/24; Y10S 379/90; Y10S 379/913

See application file for complete search history.

(56) References Cited

U.S. PATENT DOCUMENTS 6,947,758 B2 * 9/2005 Nguyen ............... H04W 76/04
370/312
8,079,079 B2 * 12/2011 Zhang .................... G06F 21/32
706/48
(Continued)

FOREIGN PATENT DOCUMENTS

CN    201689439 U    12/2010
CN    102184391 A    9/2011

OTHER PUBLICATIONS

Althinodors S. Georghiades et al., "From Few to Many: Generative Models for Recognition Under Variable Pose and Illumination", Fourth IEEE International Conference on Automatic Face and Gesture Recognition, 2000, 8 pages.
(Continued)

*Primary Examiner* — Jose Couso
(74) *Attorney, Agent, or Firm* — Rothwell, Figg, Ernst & Manbeck, P.C.

(57) ABSTRACT

The present invention relates to a method for performing face recognition in a telecommunication system (1) comprising a central repository (10) in which Face Recognition profiles attached to subscribers signed up for face recognition have been stored. The method comprises steps like: Detecting proximity between a subscriber (5) of the subscribers signed up for face recognition and an entity (6,8) involved with Face Recognition, said subscriber (5) being located within a cell coverage area (7); Migrating a Face Recognition profile attached to said subscriber, from the central repository (10) to a Network node (8) controlling the cell coverage area (7); Generating in the Network node, an extended synthetic gallery for the migrated Face Recognition profile.

21 Claims, 7 Drawing Sheets

(51) Int. Cl.
  *G06K 9/00* (2006.01)
  *H04L 29/08* (2006.01)
  *G06K 9/62* (2006.01)
  *H04W 4/02* (2009.01)

(52) U.S. Cl.
  CPC ....... *G06K 9/00979* (2013.01); *G06K 9/6201* (2013.01); *H04L 67/306* (2013.01); *H04W 4/02* (2013.01)

(56) References Cited

U.S. PATENT DOCUMENTS

| | | | |
|---|---|---|---|
| 8,644,842 B2* | 2/2014 | Arrasvuori | G06Q 30/00 455/404.2 |
| 8,902,274 B2* | 12/2014 | Malegaonkar | H04N 7/147 340/573.1 |
| 2003/0104828 A1 | 6/2003 | Nguyen | |
| 2004/0122895 A1 | 6/2004 | Gourraud | |
| 2006/0140455 A1 | 6/2006 | Costache et al. | |
| 2009/0061901 A1 | 3/2009 | Arrasvuori et al. | |
| 2011/0243449 A1 | 10/2011 | Hannuksela et al. | |
| 2012/0155718 A1 | 6/2012 | Hwang et al. | |

OTHER PUBLICATIONS

Etsi, Digital cellular telecommunications system (Phase 2+); Universal Mobile Telecommunications (UMTS); LTE; Functional stage 2 description of Location Services (LCS), ETSI TS 123 271 V9.6.0, Mar. 2011, 170 pages.

Muhammad Imran Razzak et al., "Energy Efficient Distributed Face Recognition in Wireless Sensor Network," Wireless Per Commun, vol. 60, pp. 571-582, Apr. 9, 2011, 5 pages.

\* cited by examiner

METHOD FOR PERFORMING FACE RECOGNITION IN A RADIO ACCESS NETWORK

CROSS REFERENCE TO RELATED APPLICATION(S)

This application is a 35 U.S.C. §371 National Phase Entry Application from PCT/SE2011/051464, filed Dec. 1, 2011, designating the United States, the disclosure of which is incorporated herein in its entirety by reference.

TECHNICAL FIELD

The present invention relates to methods and arrangements and, more particularly, to mechanism and techniques for enabling performance of face recognition in a telecommunication system.

BACKGROUND

Face recognition comprises of methods enabling the identification of a person's face based on a digital photography. The problem of face recognition can be cast as a standard pattern classification or machine learning problem: Given a set of face images labeled with the person's identity (the gallery set) and an unlabeled set of face images from the same group of people (the probe set), the task is to identify each person in the probe images.

Face recognition can be summarized in the following steps:
1. Face detection—the face is located in the image.
2. A collection of descriptive measurements known as a feature vector is extracted from each image.
3. A classifier is trained to assign to each feature vector a label with a person's identity (classifiers are simply mathematical functions which, given a feature vector, return an index corresponding to a subject's identity).

The methods of getting feature vectors:
Geometric feature based methods
Appearance-based methods In Geometric feature based methods properties and relations (e.g., distances and angles) between facial features such as eyes, mouth, nose, and chin have been used to perform recognition. It is claimed that methods for face recognition based on finding local image features and inferring identity by the geometric relations of these features are often ineffective. Appearance based methods—use of low-dimensional representations of images of objects or faces to perform recognition. (e.g. SLAM and Eigenfaces). Here the feature vector used for classification is a linear projection of the face image into a lower-dimensional linear subspace. However the appearance based methods suffer from an important drawback: recognition of a face under a particular lighting condition, pose, and expression can be performed reliably provided the face has been previously seen under similar circumstances.

If the gallery set was very large, appearance based classifier will perform well. But the gallery set is limited for practical reasons. To overcome this limitation, 3-D face recognition is used. 3-D recognition builds face recognition systems that use a handful of images acquired at enrollment time to estimate models of the 3-D shape of each face. 3-D models of the face shape can be estimated by a variety of methods, for example Photometric stereopsis can be used to create a 3D model (shape and reflectance) of the face from a few 2D images. The 3D face models generated using one of the above indicated methods are usually stored in Wavefront's OBJ file format. The OBJ file format is a simple data-format that represents 3D geometry alone—namely, the position of each vertex, the UV position of each texture coordinate vertex, normals, and the faces that make each polygon defined as a list of vertices, and texture vertices. An OBJ file is usually small in size. In [A. Georghiades, P. Belhumeur, D. Kriegman, From few to many: illumination cone models for face recognition under variable lighting and pose. IEEE Trans. Pattern Anal. Mach. Intell. 23, 6 (June 2001), pages 643-660.] is presented a generative appearance-based method for recognizing human faces under variation in lighting and viewpoint. The method exploits the fact that the set of images of an object in fixed pose, but under all possible illumination conditions, is a convex cone in the space of images. It can be seen a Limited gallery set used by photometric stereopsis to create a synthetic extended gallery set with variable illumination and pose.

Several over-the-top (OTT) players are using face recognition:
Facebook's automatic tag suggestion feature uses face recognition to suggest people a user might want to tag in their photos.
Security: Face recognition could one day replace password logins on favourite apps—e.g. logging in to Twitter with the face. This is currently an academic effort e.g. in 2010 Manchester University researchers were working on creating consumer-focused face recognition technology for security applications.
An application called SocialCamera allows users to snap a picture with their Android phone, instantly recognize their Facebook friends in the frame, tag the photos and post them to the Web.

The invention that will be described in this application enables an operator scenario as well as a non-operator (OTT) scenario for Face Recognition service and hence is applicable for different business scenarios.

Analysts point to the fact that face recognition technology has emerged as the fastest growing technology among the biometric technologies accepted worldwide and will continue to follow the same trend in future by growing at a CAGR of around 31% during 2011-2013. Currently operator don't offer face recognition services, but they would like to enter this market at some point. To be able to do so, some challenges need to be overcome:
Large database requirement: For a large operator with many subscribers a large galley set is required to be maintained
Centralized repository bottleneck: Traditionally the galley set is stored in a central repository. Such a central repository presents problems:
Search bottleneck: each face image will have to be matched across all the whole gallery set faces and then across all variations of illumination and pose this is extremely time consuming and negatively impacts end user application performance.
Synthetic face generation bottleneck: there is a computational cost for the synthetic generation.
Transmission cost: Moving the raw face image data from the terminal to the central server and back increases the amount of data transported via the network.
System responsiveness and user QoE: Moving the raw face image data from the terminal to the central server and back introduces delays due to RTT. This leads to a perceived sluggishness of the system which negatively impacts user QoE.

SUMMARY

An aim of the invention is to overcome above identified limitations of the prior art. The invention focuses on addressing the search bottleneck by limiting the number of candidate images in the image data set by performing search on only a subset of images where the subset is created based on user location information, and by reducing the computational cost of synthetic generation by running the synthetic generation of the images on only a subset of the dataset and further by reducing the response time of the overall system (and thus enhance the user experience) by moving the dataset and performing the image matching closer to an end user. The solution according the invention comprises method steps like, detecting proximity between a first subscriber and an entity involved with Face Recognition such as a cache holding node or a an additional subscriber, migration of a Face Recognition profile attached to the first subscriber, from a central repository to a (the) cache holding node that control a coverage area in which the first subscriber is located, and generating an extended synthetic gallery in the cache holding node.

The solution in one exemplified embodiment is a method for performing face recognition in a telecommunication system comprising a central repository in which Face Recognition profiles attached to subscribers signed up for face recognition have been stored. The method comprises the following steps:

proximity is detected between at least two subscribers of the subscribers signed up for face recognition. The at least two subscribers are detected to be located within a radio coverage area controlled by a Network node.

Face Recognition profiles attached to the at least two subscribers are migrated from the central repository to the Network node.

An extended synthetic gallery for each migrated Face Recognition profile is generated in the Network node.

The solution in another exemplified embodiment is a method for performing face recognition in a telecommunication system comprising a central repository in which Face Recognition profiles attached to subscribers signed up for face recognition have been stored. The method comprises the following steps:

proximity between a subscriber of the subscribers signed up for face recognition and an entity involved with Face Recognition is detected, said subscriber being located within a cell coverage area.

A Face Recognition profile attached to said subscriber is migrated from the central repository to a Network node controlling the cell coverage area (7).

An extended synthetic gallery for the migrated Face Recognition profile is generated in the Network node.

The solution in yet another exemplified embodiment is a Network node of a mobile telecommunication network, configured to perform face recognition. The node comprises:

A first interface configured to receive Face Recognition profiles;

A caching unit configured to store migrated Face Recognition profiles;

A processing unit running a face recognition process configured to generate an extended synthetic gallery of a migrated Face Recognition profile.

The solution in yet another exemplified embodiment is a Network node of a mobile telecommunication network configured to migrate Face Recognition profiles, said node comprising:

A fourth interface configured receive location reports.

A processing unit configured to detect proximity between different entities.

A third interface configured to forward migrated Face Recognition profiles.

Objects of the invention are to increase search acceleration, reduce computational resource requirement and reduce upload/download latency in an operator and non-operator scenario. These objects and others are achieved by methods, arrangements, computer program product and nodes.

The invention has advantages such as solving the problems of performing extensive searches in a large image dataset by limiting the dataset in which the search will be performed.

The invention will now be described more in detail with the aid of preferred embodiments in connection with the enclosed drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
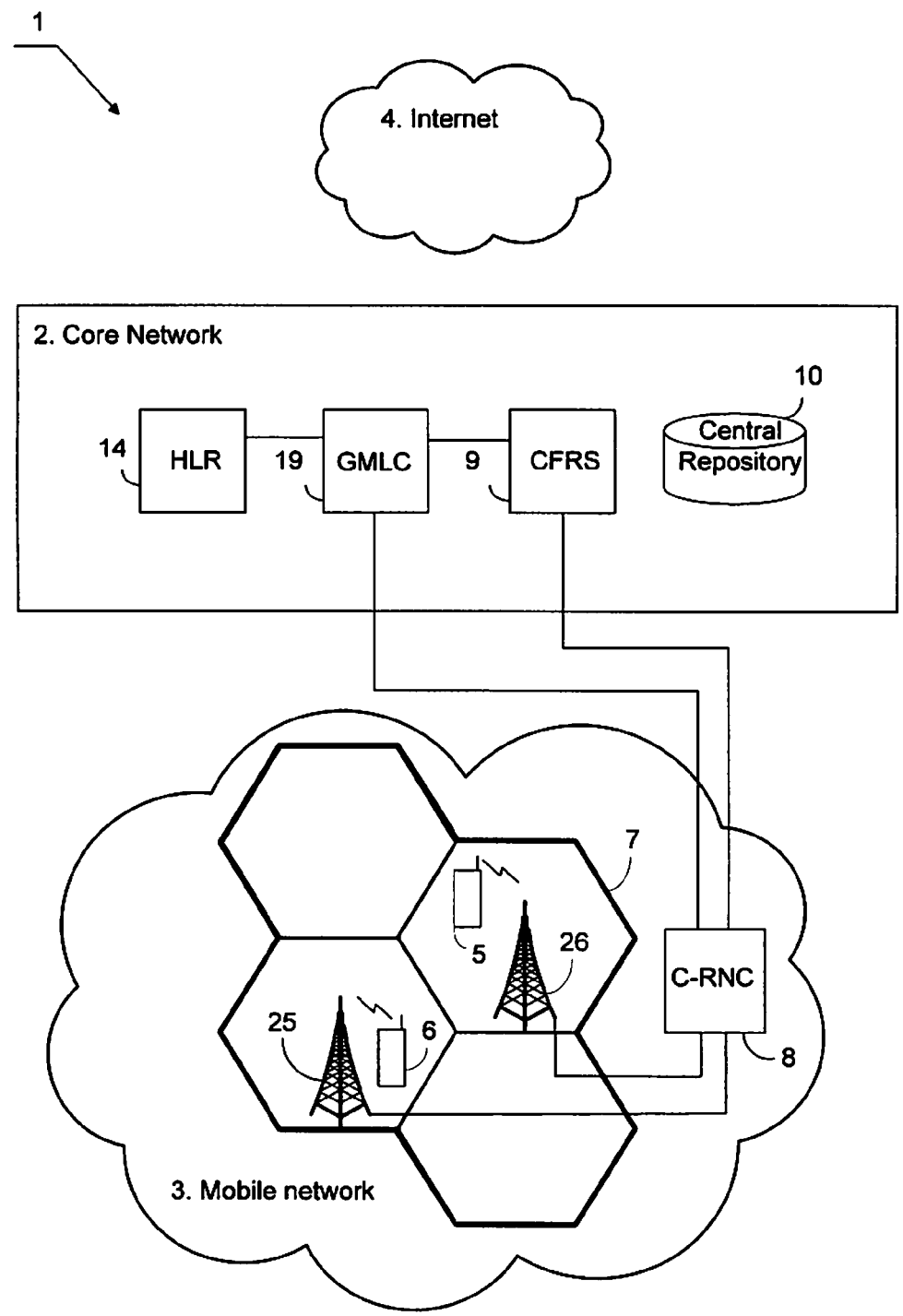
FIG. 1 discloses a block schematic illustration of a telecommunication system comprising an Internet network attached via a Core network to a mobile network that comprises a Cloud Radio Network Controller C-RNC.

FIG. 1 discloses a telecommunication system 1 comprising an Internet network 4 attached via a Core network 2 to a mobile network 3. Mobile and personnel location systems are becoming more and more common and important. Architecture for LoCation Service (LCS) is designed by 3GPP [see TS 23.271 'Functional stage 2 description of Location Services']. Central point of whole architecture is a Gateway Mobile Location Center GMLC 19. It contains functionality required to support LCS. The LCS client is in FIG. 1 located within a Central Face Recognition Server CFRS 9 in the Core Network 2. GMLC is the first node an external LCS client accesses in a GSM or UMTS network. The GMLC may request routing information from a Home Location Register HLR 14 or Home Subscriber Server HSS. After performing registration authorization, it sends positioning requests to either a Visited Mobile Switching Centre VMSC, Serving GPRS Support Node SGSN or Mobile Switching Centre MSC Server and receives final location estimates from the corresponding entity. The VMSC, SGSN or MSC connect to the corresponding Access Network and the Access Network will provide the positioning of the UE. The Core Network 2 further comprises a Central Repository 10 wherein data for subscribers signed up for Face Recognition has been stored. The GMLC 19 and CFRS 9 are attached to a Cloud Radio Network Controller C-RNC 8 in the Mobile Network 3. The C-RNC is also called a Network node in this application. Distributed cloud computing is part of prior art and is the use of distributed computing nodes to achieve the task of a centralized node. The main criteria of distributed cloud computing is that computing nodes are spread out in the network (geographically, topologically) and hence are closer (shorter RTT, less network hops) to an end user. The C-RNC 8 will be further explained later in this application together with FIG. 2. The Mobile network further comprises base stations 25, 26 attached to the C-RNC 8. User Equipments 5,6, i.e. subscribers, are located within cell areas of the base stations. A radio coverage area 7 comprises in this example all the cell areas handled by base stations controlled by the C-RNC 8. To be noted is that this is an example and also coverage areas controlled by for example RNC (3G), eNodeB (LTE), GGSN or PDN gateway are applicable for the invention.

Figure 2:
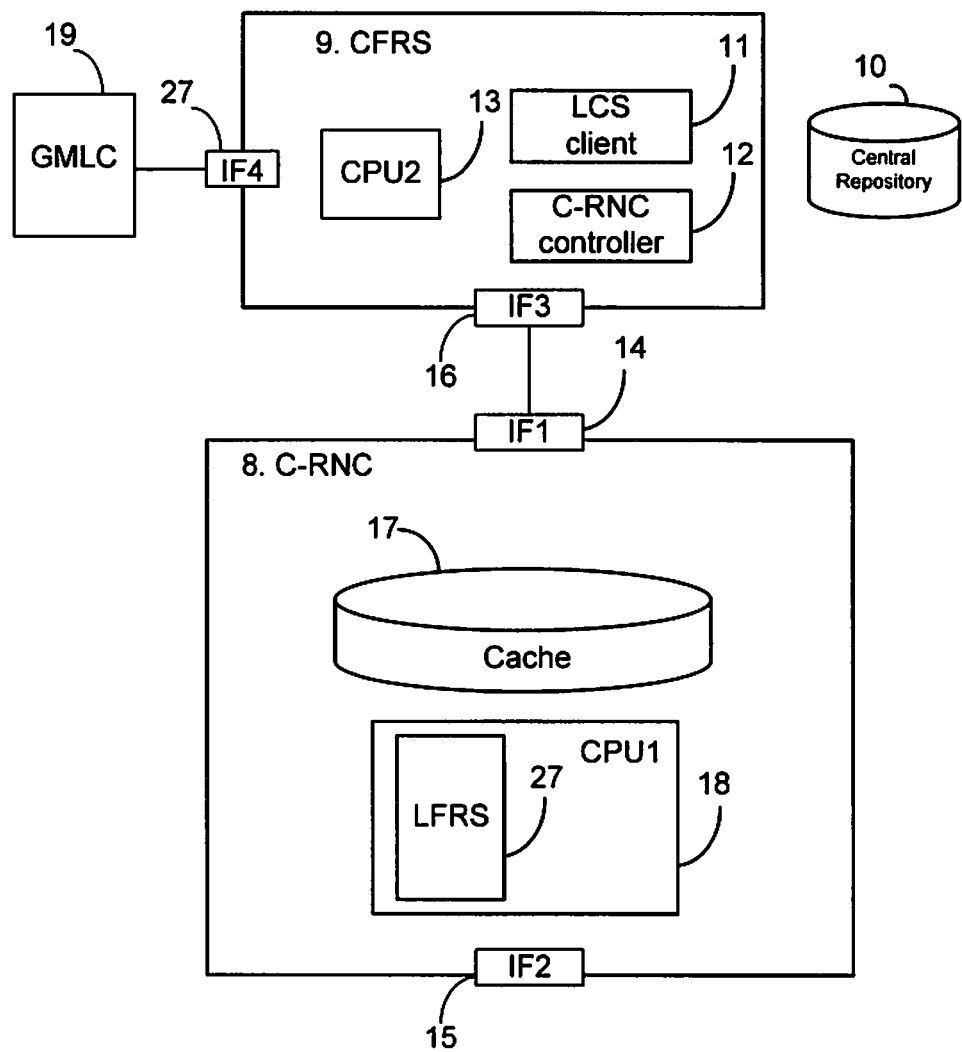
FIG. 2 discloses in an operator scenario, a Central Face Recognition Server CFRS attached to the Cloud Radio Network Controller C-RNC.

FIG. 2 discloses an embodiment of the Cloud Radio Network Controller C-RNC 8 attached to the Central Face Recognition Controller CFRS 9 in an operator scenario. Distributed cloud computing has a functional element which coordinates the invocation and de-invocation of Virtual Machines VMs which is called the cloud manager. The cloud manager works via a cloud middleware to access the resources in each node. A Central Processor Unit CPU1 18 is acting as a virtualized computer. Instead of running one operating system on top of the hardware, a hypervisor runs as a cloud middleware between the cloud manager and the hardware. The hypervisor hereby acts as a hardware controller that manages the shared hardware resources among the virtual machines. The main intent of the hypervisor is to instantiate the virtual machines, provision the resources and make sure that the resources are shared in a manner decided by an operator, among the executing operating systems. A Local Face Recognition Server LFRS 27 acts in this example as a process running in a virtual machine. The C-RNC comprises a cache 17 wherein received Face Recognition profiles are to be stored. The C-RNC 8 further comprises a first interface IF1 14 configured to receive Face Recognition profiles from the CFRS 9 and a second interface IF2 16 configured to receive a face recognition requests and to either forward the received request or to forward metadata. The Central Face Recognition Server CFRS 9 shown in FIG. 2 comprises the already mentioned LCS client 11 and a C-RNC controller 12 that is responsible for forwarding Face Recognition profiles received from the central repository 10. To be noted is that in this example the central repository is located outside the CFRS e.g. in the Core network 2 or in the Internet 4 but it might as well be located inside the CFRS. The CFRS comprises a database (not in figure) wherein identities of different C-RNCs and the locations they cover are stored. The CFRS further comprises a Central Processor Unit CPU2 13, a third interface IF3 16 responsible for forwarding Face recognition profiles to the C-RNC 8 and a fourth interface IF4 27 responsible to receive location reports from the Gateway Mobile Location Center GMLC 19.

Figure 3:
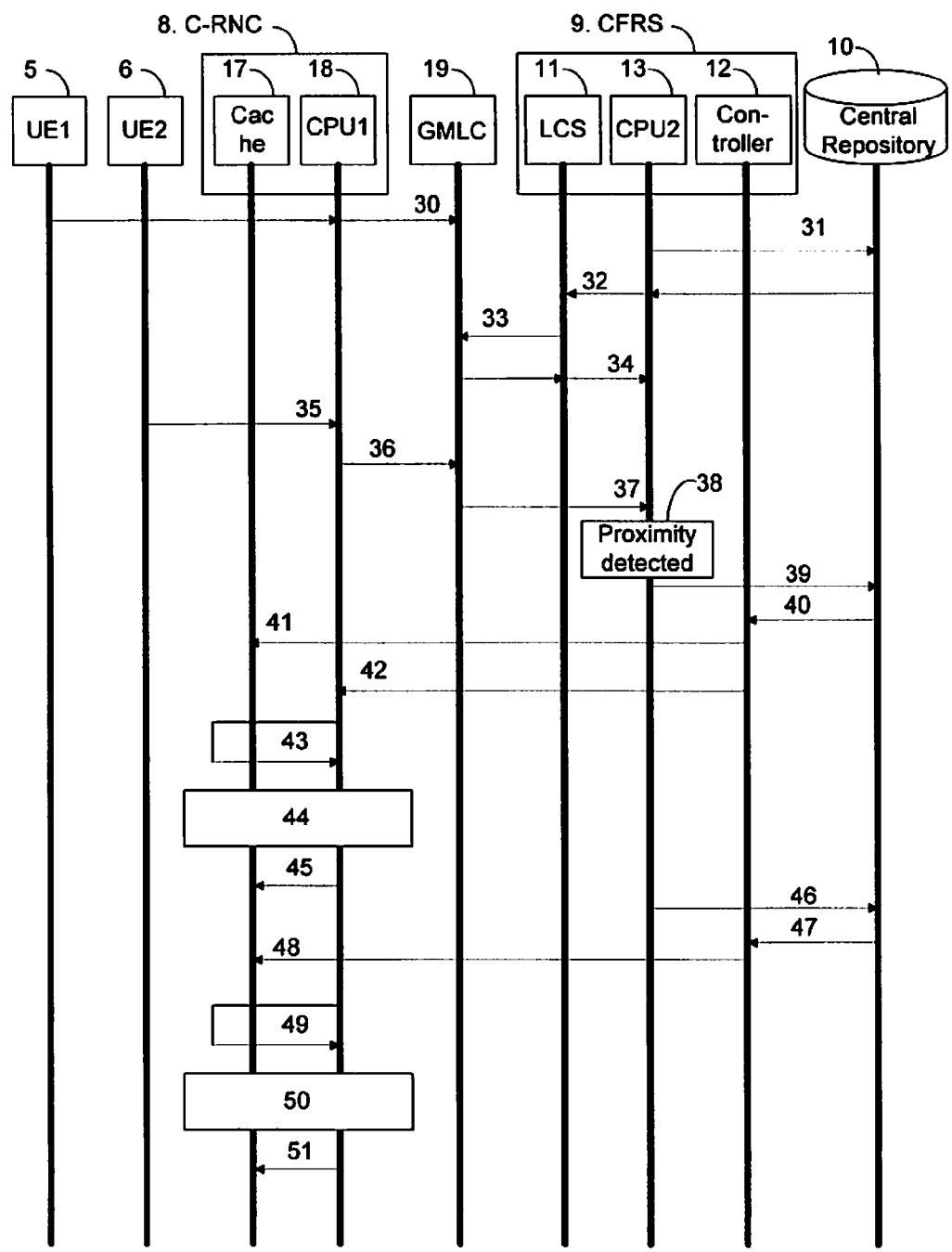
FIG. 3 discloses a signal sequence diagram of a method in an operator scenario to migrate Face Recognition profiles from a central repository to the Cloud Radio Network Controller after detected proximity between subscribers.

FIG. 3 discloses a first embodiment of a method of the invention. FIG. 3 discloses a signal sequence diagram of a method in operator scenario to migrate Face Recognition profiles from the central repository 10 to the Cloud Radio Network Controller C-RNC 8 after proximity has been detected between two subscribers within the coverage area 7 controlled by the C-RNC. Other signalling points 5,6,17, 18,19,9,11,13 and 12 included in FIG. 3 have been explained earlier together with FIG. 1-2. A pre-requisite for the invention is that subscribers have signed up for Face Recognition service with an operator. After the contract is signed, the operator confirms the UE identity of the subscriber (e.g. MSISDN, telephone number etc) from the operator subscriber database (HSS/HLR). A FR profile is then created. Fields of the profile is shown in the table below with example values.

Subscriber FR Profile

| Field | | Value |
| --- | --- | --- |
| UE identity | | UE identity of subscriber e.g. MSISDN |
| Gallery set | | Folder name containing face images of subscriber |
| 3D face model | | File name of subscriber 3D model e.g. OBJ file |
| Metadata | Display name | Subscriber elected name |
| | Social network IDs | Facebook ID, Twitter ID, Google + ID etc |
| | Contact info | Telephone number, Skype ID etc |
| | Other metadata | . . . |

A gallery set of face images are then captured of the user. This could be done using one of the multiple methods described in the background part of this application. A 3D model is generated from the gallery. Gallery and 3D model stored in the FR profile in the central repository 10. The subscriber enters (e.g via a web GUI) metadata information to be associated with the FR profile. The subscriber enters data and the UE identity is according to the invention stored in the FR profile in the central repository 10.

A method according to a first embodiment of the invention after fulfilled pre-requistes comprises the following step:

A first subscriber UE1 attaches to the radio coverage area 7 controlled by the C-RNC 8, the location server GMLC 19 gets a report of the first subscribers attachment. This signaling is shown in FIG. 3 with a reference sign 30.

The CFRS controller requests 31 a list of all FR service subscribers' UE identities from the central repository 10.

The UE identity list is sent 32 from the central repository to the LCS client 11 in the CFRS 9.

As mentioned, the CFRS 9 has database with storage of C-RNCs and the locations they cover. The LCS client triggers a location reporting request for all of the UE identities present in coverage areas controlled by the C-RNCs. The request is sent 33 from the LCS client 11 to the GMLC 19.

The GMLC sends 34 periodic reports on found subscribers location status to CFRS 9 e.g. the first subscriber UE1 is found to be located in the radio coverage area 7 controlled by the C-RNC 8.

A second FR service subscriber UE2 6 (also called entity) attaches 35 to the radio coverage area 7 controlled by the C-RNC 8. The location server GMLC 19 gets 36 a report of the second subscriber's attachment. The GMLC sends 37 the report to CFRS 9.

By comparing the location of the second subscriber with the database of C-RNC locations, the CPU2 13 in CFRS 9 infers that the second subscriber 6 is in the same coverage area 7 as the first subscriber 5 i.e. the two subscribers are in proximity 38 to each other i.e. they are located within the same coverage area 7.

CFRS 9 requests 39 the 3D model and the metadata of the second subscriber 6. The request comprises the second subscriber's UE identity.

3D model and metadata that belongs to the second subscriber is returned 40 to the C-RNC controller 12 in CFRS.

Using an extracted C-RNC ID of C-RNC 8, the CFRS uploads 41 the 3D model and metadata into the cache 17 of the C-RNC 8.

If not already started, the CFRS starts 42 an instance i.e. the Local Face Recognition Server LFRS 27 (FIG. 2) of the FR server in the C-RNC.

The Local Face Recognition Server LFRS 27 gets 43 the 3D model from the cache.

An extended synthetic gallery set is generated 44.

The generated gallery is stored 45 in the cache 17.

CFRS request 46 the 3D model and the metadata of the first subscriber 5. The request comprises the first subscriber's UE identity.

3D model and metadata that belongs to the first subscriber is returned 47 to the C-RNC controller 12 in CFRS.

Using an extracted C-RNC ID of C-RNC 8, the CFRS uploads 48 the 3D model and metadata into the cache 17 of the C-RNC 8.

The Local Face Recognition Server LFRS 27 gets 49 the 3D model from the cache.

An extended synthetic gallery set is generated 50.

The generated gallery is stored 51 in the cache 17.

Figure 4:
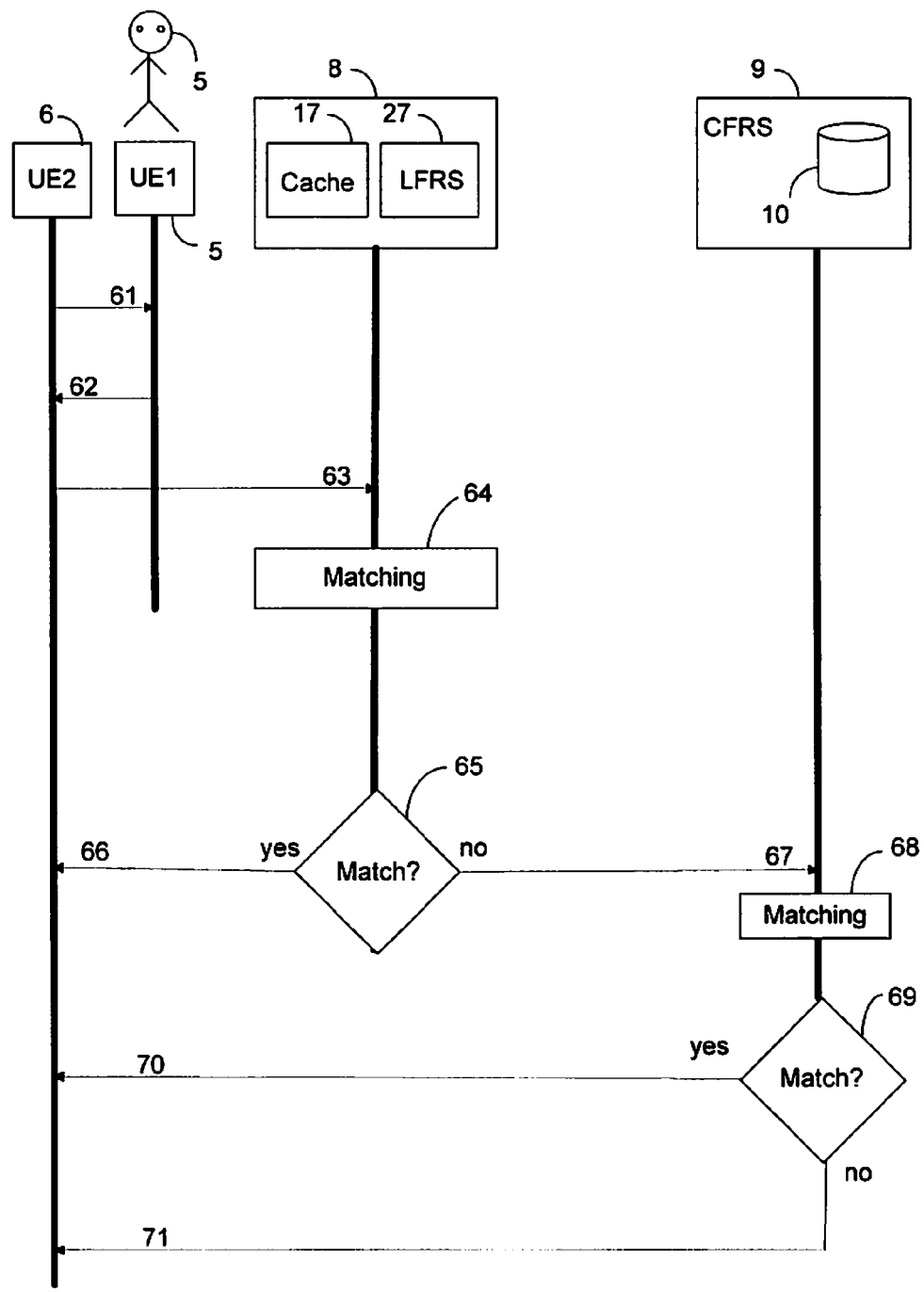
FIG. 4 discloses a signal sequence diagram of a method in an operator scenario to use extended synthetic galleries generated in a Cloud Radio Network Controller.

FIG. 4 discloses a signal sequence diagram of a method in an operator scenario to use extended synthetic galleries generated in the Cloud Radio Network Controller C-RNC 8 as disclosed in the first embodiment. The signaling points 5,6,8,17,27,9,10 shown in FIG. 4 have all been explained earlier in the application. In this example the central repository 10 is located within the CFRS 9. The method comprises the following steps:

The second subscriber 6 takes/capture 61 a photo of the first subscriber 5 by using his User Equipment's UE's camera.

The face image of the first subscriber is received 62 to the second subscriber.

A Face Recognition request comprising the face image is sent 63 from the second subscriber to the Cloud Radio Network Controller C-RNC 8.

The Local Face Recognition Server LFRS 27 (FIG. 2) tries to match 64 the face image with the generated 50 (FIG. 3) synthetic gallery sets using well known image recognition methods.

If there was a match 65 the metadata corresponding to the recognized image is returned 66 to the second subscriber's User Equipment UE2. If there was no match 65 the request is forwarded 67 to the CFRS 9.

The CFRS 9 tries to match 68 the image using all existing subscriber galleries in the central repository 10.

Upon successful match 69 the metadata is returned 70 to the second subscriber's User Equipment UE2. If the match 69 was unsuccessful then an error message is returned 71 to the second subscriber.

Figure 5:
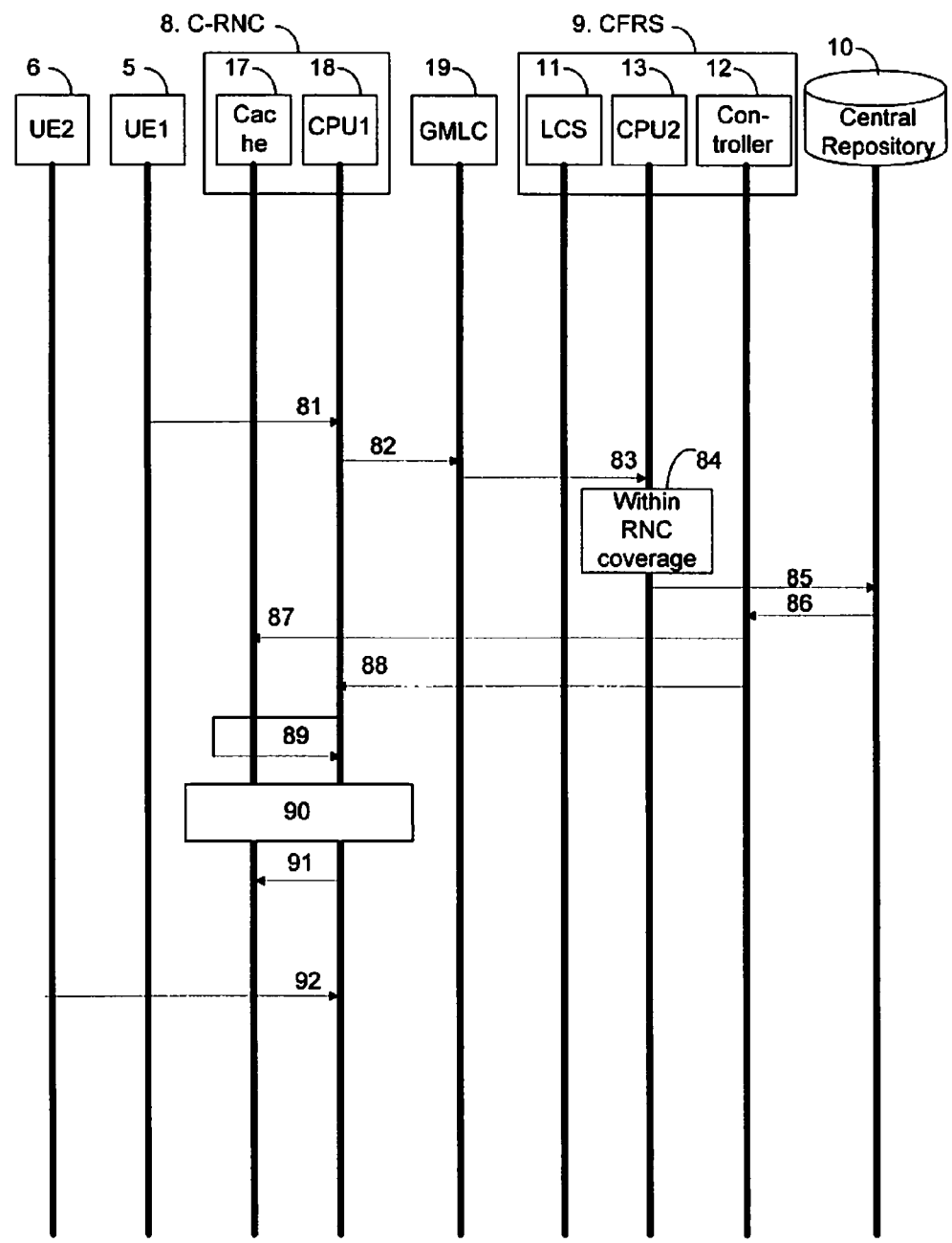
FIG. 5 discloses a signal sequence diagram of a method in an operator scenario to migrate Face Recognition profiles from a central repository to the Cloud Radio Network Controller after detected proximity between a subscriber and a Network node.

FIG. 5 discloses a second embodiment of a method the invention. Signalling points in FIG. 5 have been explained earlier together with FIG. 1-2. FIG. 5 discloses a signal sequence diagram of a method in an operator scenario to migrate Face Recognition profiles from the central repository 10 to the Cloud Radio Network Controller C-RNC 8 after proximity has been detected between a subscriber and a cache holding entity, in this example the node C-RNC 8, i.e. after the subscriber has attached to the coverage area 7 controlled by the C-RNC 8. The second embodiment requires pre-requisites like the first embodiment. In the second embodiment at least the first subscriber must have signed up for Face Recognition etc. A method according to the second embodiment of the invention thereafter comprises the following step:

The first FR service subscriber UE1 5 attaches 81 to a radio coverage area 7 controlled by the C-RNC 8. The location server GMLC 19 gets 82 a report of the first subscriber's attachment. The GMLC sends 83 the report to CFRS 9.

By comparing the location of the first subscriber with the database in CFRS 9 of C-RNC locations, the CPU2 13 in CFRS 9 infers 84 that the first subscriber 5 is in the coverage area 7 controlled by C-RNC 8.

CFRS 9 requests 85 the 3D model and the metadata of the first subscriber 5. The request comprises the second subscriber's UE identity.

3D model and metadata that belongs to the first subscriber is returned 86 to the C-RNC controller 12 in CFRS.

Using an extracted C-RNC ID, the CFRS uploads 87 the 3D model and metadata into the cache 17 of the C-RNC 8.

The CFRS starts 88 an instance i.e. the Local Face Recognition Server LFRS 27 (FIG. 2) of the FR server in the C-RNC.

The FR server gets 89 the 3D model from the cache.

An extended synthetic gallery set is generated 90.

The generated gallery is stored 91.

The second embodiment accomplishes a quick start-up of the face recognition system. As soon as another subscriber, for example the second subscriber 6, attaches 92 the coverage area the second subscriber will be able to immediately capture a picture of the first subscriber and request information without waiting for its own Face Recognition profile to be migrated. Returning again to FIG. 4, in a situation described by the second embodiment the second subscriber 6, that do not have to be a subscriber signed up for face recognition and might be a subscriber that only has an application that can capture images and can make FR requests, can now immediately after having entered into the coverage area 7 request information of the first subscriber. This quick start of the process enhances Quality of Experience for the second subscriber.

Figure 6:
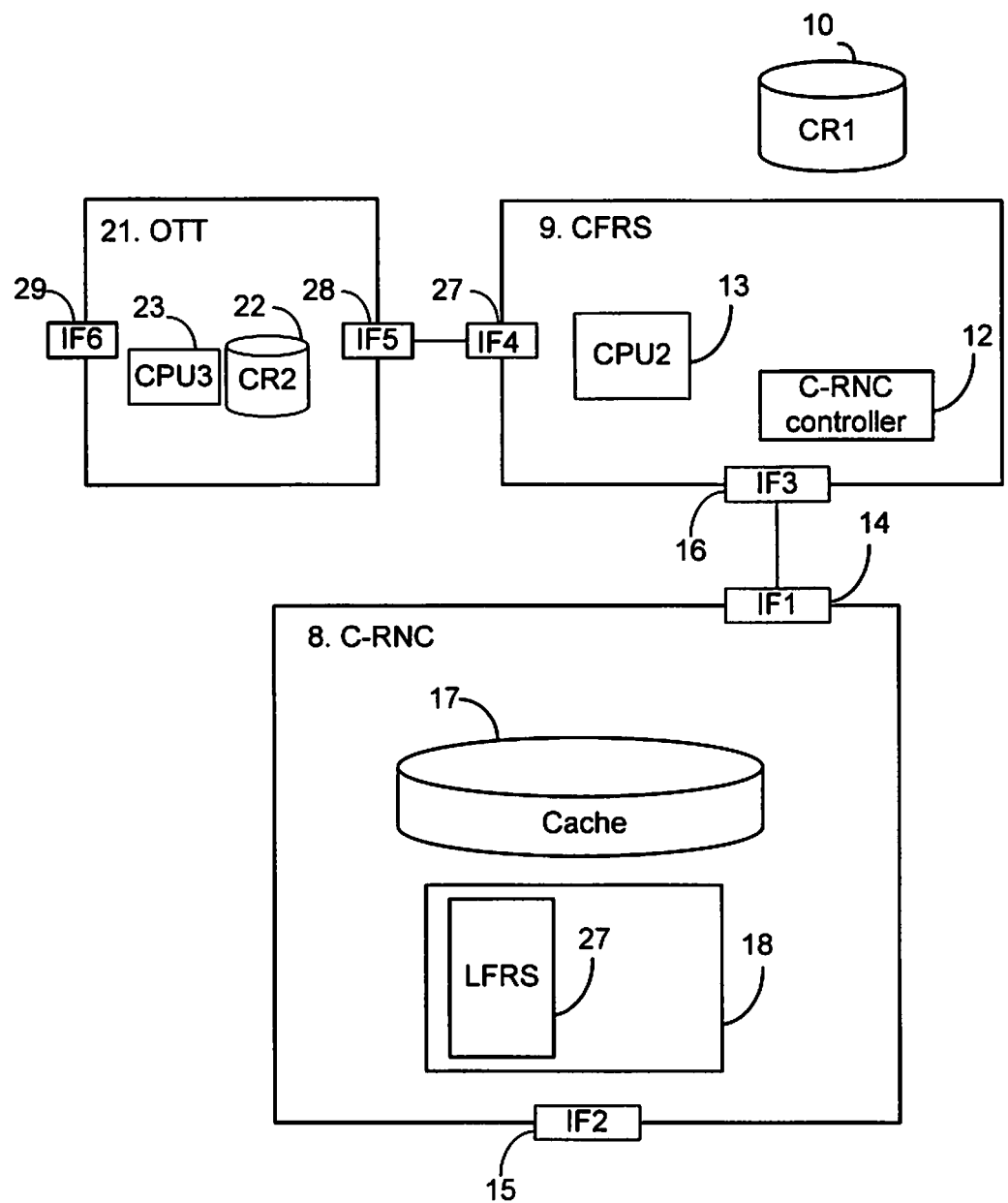
FIG. 6 discloses in a non-operator scenario, a Central Face Recognition Server CFRS attached to a server handled by an Over The Top OTT company, and attached to a Cloud Radio Network Controller.

FIG. 6 discloses in a non-operator scenario, an embodiment of the Cloud Radio Network Controller C-RNC 8 attached to the Central Face Recognition Controller CFRS 9. CFRS is attached to an Over The Top OTT service provider 21. The OTT service provider might be located in the Internet 4. The C-RNC has already been described together with FIG. 2. The Central Face Recognition Server CFRS 9 has also been described together with FIG. 2. In this non-operator scenario the earlier mention LSC client in CFRS has been excluded. Furthermore, the CFRS 9 comprises a fourth interface IF4 27 used to receive GPS coordinates from the OTT provider 21. The OTT 21 comprises a central repository wherein Face Recognition FR profiles that belong to subscribers signed up for face recognition with the OTT provider have been stored. The OTT provider further comprises a Central Processing Unit CPU3 23, a fifth interface IF5 28 responsible to forward Face Recognition FR profiles to the CFRS 9 and a sixth interface IF6 29 used to get location coordinates from subscribers/terminals.

Figure 7:
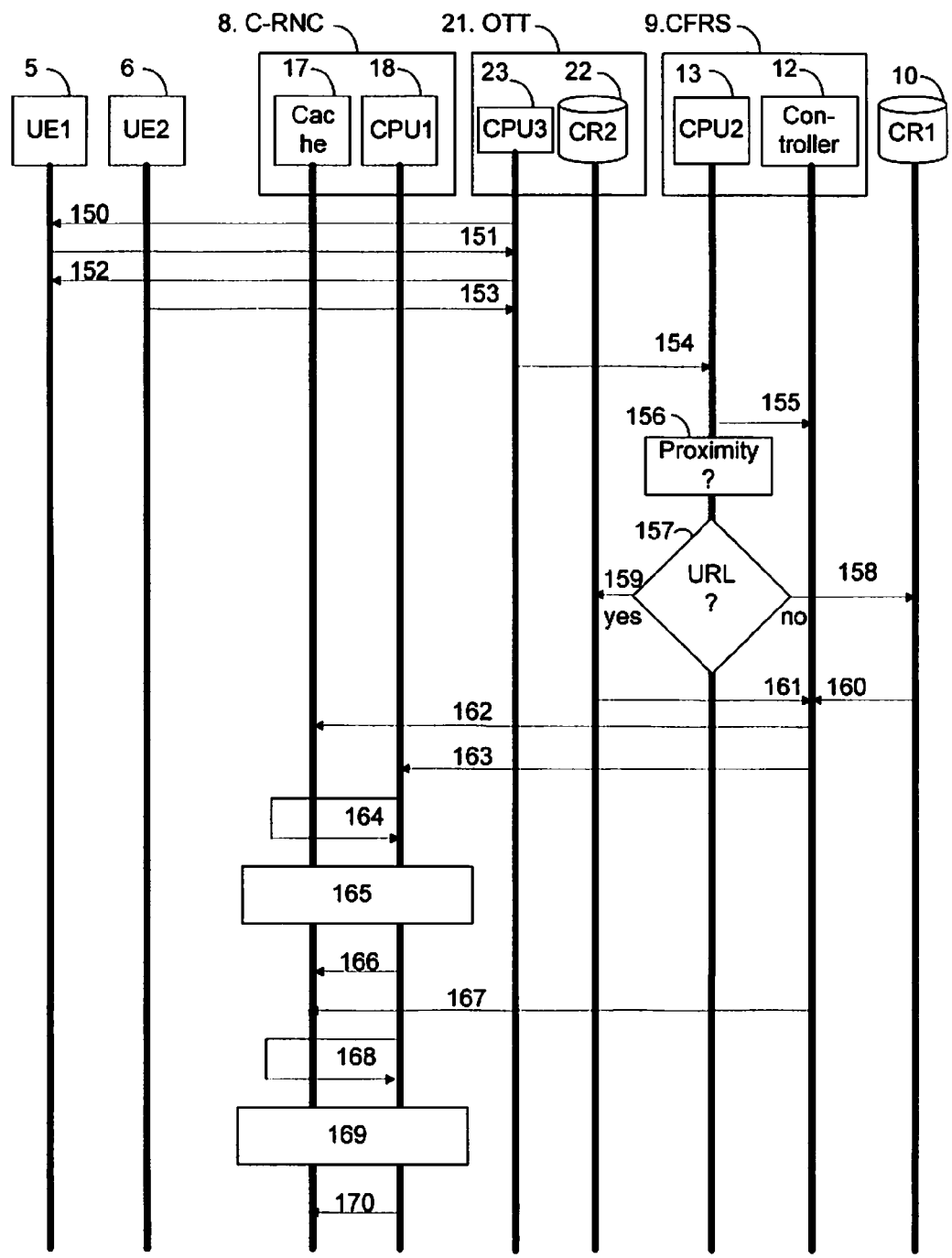
FIG. 7 discloses a signal sequence diagram of a method in a non-operator scenario to migrate Face Recognition profiles from a central repository to the Cloud Radio Network Controller C-RNC.

FIG. 7 discloses a third embodiment of a method of the invention. The figure discloses a signal sequence diagram of a method in a non-operator scenario to migrate Face Recognition profiles from a central repository, either from CR1 or CR2 to the Cloud Radio Network Controller C-RNC after proximity has been detected between two subscribers within the coverage area 7 controlled by the C-RNC 8. The signaling points 5,6,8,17,18,21,22,23,9,12,13 and 10 included in FIG. 7 have been explained earlier together with the previous figures. A pre-requisite for the invention is that subscribers have signed up for Face Recognition service with an operator in the same way as in the earlier described method. However, in this embodiment a subscriber might have signed up with an operator (like earlier mentioned) or with an OTT service provider. In the first case, FR profiles are stored in the central repository CR1 10 and in the second case FR profiles are stored in the central repository CR2 22. CR2 is reachable with a Uniform Resource Locator URL. Like before, subscribers enters data, and their UE identity (for example the subscribers' telephone number) is according to the invention stored in the FR profile in one of the central repositories 10 or 22.

A method according to the third embodiment of the invention after fulfilled pre-requistes comprises the following step:

The OTT 21 uses GPS information collected 150-151, 152-153 from subscribers 5,6 to infer that several terminals (having the FR service) are in close proximity to each other. An indicator to start might be that the FR application is turned on and this means that the end users may like to perform face recognition.

The coordinates of the group is sent 154, 155 to the operator i.e. to the CFRS 9 via prior defined interface.

The operator selects the best (topologically closest) mobile network node which will serve the end users. This is done by a lookup in a C-RNC-GPS coordinates mapping table.

Upon selecting an RNC, the 3D model and metadata needs to be fetched. It's fetched either 157 from the operator's repository 158, 160 or pulled 159, 161 from the OTT server's repository 22 if an URL was provided.

The remaining method steps 162-166 and 167-170 for sending 3D model and metadata, starting FR server instance, generating a synthetic gallery, storing etc for both subscribers 5 and 6, corresponds to the in FIG. 3 earlier described method steps 41-45 and 48-51.

The removal of the gallery from the C-RNC is the reverse process of creating it. The condition for removal of the data is that the subscriber of the data set has left the cell. The FR process is stopped and the FR data is marked for 'could be deleted' and is deleted from the storage to make way for new data to be stored in the C-RNC. Also in the situation when the subscriber who's data is in the C-RNC is still in the coverage area, but there are not other subscribers who could make a FR request, the FR process is suspended in the C-RNC to conserve resources and resumed only when potential other subscribers enter coverage.

System and nodes that can be used to put the invention into practice is schematically shown in the figures. Enumerated items are shown in the figures as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI), Long Term Evolution (LTE) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method for performing face recognition in a telecommunication system comprising a central repository in which face recognition profiles attached to subscribers signed up for face recognition have been stored, the method comprising:
   detecting proximity between at least two subscribers of the subscribers signed up for face recognition, said at least two subscribers being located within a radio coverage area controlled by a network node;
   migrating face recognition profiles attached to said at least two subscribers, from the central repository to the network node; and
   generating in the network node, an extended synthetic gallery for each migrated face recognition profile.

2. The method for performing face recognition according to claim 1, further comprising:
   capturing by a first subscriber of the at least two subscribers, an image of a second subscriber of the at least two subscribers;
   sending a face recognition request comprising the captured image, from the first subscriber to the network node;
   starting up of a face recognition process in the network node; and performing in the network node image matching of the captured image with at least one of the extended synthetic galleries.

3. The method for performing face recognition according to claim 2, further comprising:
as a result of a successful image matching, forwarding metadata related to the second subscriber, to the first subscriber.

4. The method for performing face recognition according to claim 2, further comprising:
as a result of an un-successful image matching, forwarding the face recognition request from the network node to a controller of the central repository.

5. The method for performing face recognition according to claim 2, wherein the face recognition process is started up in a virtual environment.

6. The method for performing face recognition according to claim 1, wherein a face recognition profile comprises a limited face gallery, an estimated 3D face model and metadata.

7. The method for performing face recognition according to claim 1, wherein proximity between said at least two subscribers is detected by using inputs from a location server.

8. The method for performing face recognition according to claim 1, wherein a stored profile is attached to a signed up subscriber's terminal after a dialog between the subscriber and a service provider.

9. The method for performing face recognition according to claim 8, wherein proximity between said at least two subscribers is detected by using GPS data received from said terminals.

10. The method for performing face recognition according to claim 1, wherein migrated data is removed from the network node when at least one subscriber of said at least two subscribers leave the radio coverage area.

11. A method for performing face recognition in a telecommunication system comprising a central repository in which face recognition profiles attached to subscribers signed up for face recognition have been stored, the method comprising:
detecting proximity between a first subscriber of the subscribers signed up for face recognition and an entity involved with face recognition, said subscriber being located within a cell coverage area;
migrating a face recognition profile attached to said subscriber, from the central repository to a network node controlling the cell coverage area; and
generating in the network node, an extended synthetic gallery for the migrated face recognition profile.

12. The method for performing face recognition according to claim 11, said entity being the network node.

13. The method for performing face recognition according to claim 11, said entity being a second subscriber located within the coverage area.

14. The method for performing face recognition according to claim 13, said second subscriber being not signed up for face recognition and having an application that can capture images and can make face recognition requests.

15. A network node of a mobile telecommunication network configured to perform face recognition, said node comprising:
a first interface configured to receive migrated face recognition profiles;
a non-transitory computer readable memory configured to implement a caching unit, the caching unit configured to store migrated face recognition profiles; and
a processor running a face recognition process configured to generate an extended synthetic gallery of a migrated face recognition profile.

16. The network node according to claim 15, the node further comprising:
a second interface configured to receive a face recognition request comprising a captured image; and
the processor configured to perform image matching of the captured image with the extended synthetic galleries.

17. The network node according to claim 16, wherein the second interface is further configured to transmit at least one of a face recognition request and metadata.

18. The network node according to claim 15, wherein the processor is configured to run a virtualized environment capable to start or stop the face recognition process.

19. A network node of a mobile telecommunication network configured to migrate face recognition profiles, said node comprising:
a first interface configured to receive location reports;
a processor configured to detect proximity between different entities; and
a second interface configured to forward migrated face recognition profiles.

20. The network node according to claim 19, wherein the first interface further being configured to receive face recognition profiles.

21. A non-transitory computer program product comprising computer program code, wherein the computer program comprises code adapted to perform the method of claim 1, when the computer program code is executed in the processor.

* * * * *